United States Patent [19]
Shiozaki et al.

[11] Patent Number: 6,101,866
[45] Date of Patent: Aug. 15, 2000

[54] MAIN-SHAFT MALFUNCTION-STATE DETECTOR IN AN AIR BEARING TYPE MACHINE TOOL

[76] Inventors: Masahito Shiozaki, 701, Shimotogari, Nagaizumi-cho, Sunto-gun, Shizuoka-ken; Takeshi Momochi, 36-9, Hongo-cho, Numazu-shi, Shizuoka-ken; Hideo Fujie, 1194-37, Shimotogari, Nagaizumi-cho; Kazuo Nagashima, 515-85, Higashino, Nagaizumi-cho, both of Sunto-gun, Shizuoka-ken, all of Japan

[21] Appl. No.: 09/127,908

[22] Filed: Aug. 3, 1998

Related U.S. Application Data

[62] Division of application No. 08/837,724, Apr. 22, 1997, Pat. No. 5,877,408.

[30] Foreign Application Priority Data

Apr. 23, 1996 [JP] Japan .................................. 8-101327

[51] Int. Cl.[7] .................................................. G01B 13/08
[52] U.S. Cl. ........................................ 73/37.5; 73/862.68
[58] Field of Search .................................. 73/37.5, 37.6, 73/593, 600, 9, 862.381, 862.68; 324/662

[56] References Cited

U.S. PATENT DOCUMENTS

| | | | |
|---|---|---|---|
| 4,433,571 | 2/1984 | Snow, Jr. | 73/37.5 |
| 4,977,777 | 12/1990 | Bieg | 73/37.5 |
| 5,174,039 | 12/1992 | Murai | 73/37.5 |
| 5,311,763 | 5/1994 | Gibbs, Jr. et al. | 73/9 |
| 5,748,005 | 5/1998 | McCormick et al. | 324/662 |

FOREIGN PATENT DOCUMENTS 09257037  9/1997  Japan .

*Primary Examiner*—Max Noori
*Attorney, Agent, or Firm*—Finnegan, Henderson, Farabow, Garrett & Dunner, L.L.P.

[57] ABSTRACT

A main-shaft malfunction-state detector in an air bearing type machine tool, in which an abnormal contact of a main shaft with a housing is reliably and automatically detected. The contacting state of the main shaft 11 and the housing 13 is detected through the presence of electric conductivity by a contact detection means 31. A contact decision means 32 determines the contact of the main shaft 11 with the housing 13 based on the detected conductivity, thus automatic and certain preventative measures, such as the main shaft of the machine tool stops and so on, are based on the above decision.

2 Claims, 7 Drawing Sheets

MAIN-SHAFT MALFUNCTION-STATE DETECTOR IN AN AIR BEARING TYPE MACHINE TOOL

This is a division of application Ser. No. 08/837,724, filed Apr. 22 1997, now U.S. Pat. No. 5,877,408, which is incorporated herein by reference.

BACKGROUND OF THE INVENTION

1. Field of the Invention

This invention relates to a main-shaft malfunction-state detector in an air bearing type machine tool, using for detecting an abnormal contact of a main shaft in a machine tool for a cutting process of a relatively heavy load in which the main shaft is supported in an air static-pressure bearing, and so on.

2. Description of the Related Art

Conventionally, a machine tool is used for, for example, cutting various metallic materials.

The machine tool has a cutting tool attached at an end of a main shaft rotatably supported, in which the tool is rotated by rotatably driving the main shaft with a shaft driving motor, thereby performing a cutting process for a work piece.

Support for the Main Shaft

The conventional machine tool uses various bearings for rotatably supporting the main shaft.

For example, an air static-pressure bearing is used for the machine tool for carrying out a ultra-precise cutting process for the cutting light load (e.g., in the case of a mirror finish of light-metal material by using diamond bit).

In the aforementioned process, it has been difficult to produce deformation of the main shaft because of the light load, and there is little possibility that the main shaft will be in contact with the housing.

As to the Air Bearing

The air bearing is, conventionally, used for only process for the light load, however, the present applicant proposes the air bearing type machine tool which is capable of being used for the heavy load by enlarging a bearing clearance (see Japanese Patent Application Laid-open No. Hei 8-70219).

Here, where the air bearing type machine tool is used in the process for the high load, the deformation of the main shaft caused by the load occurs easily, so that attention to the abnormal contact of the main shaft is required.

Further, in the normal cutting process, there is the potential that the process is carried out under conditions exceeding the forecast made in the design.

For example, in the process where the tool attached at the main shaft is projected more than usual, a large moment is acted to the bearing portion. Generally, in the air bearing, the main shaft should not be in contact with the bearing portion of the housing, but an abnormal contact is produced when the degree of the deformation of the main shaft, caused by the moment, exceeds the space between the bearing and the main shaft.

If the operation continues while the abnormal contact of the air bearing described above remains, the disadvantage is that a seizure is produced resulting in a break.

In order to avoid the break, it is required the main shaft is immediately stopped to stop the process when the aforementioned abnormal contact is produced.

In order to avoid breaking, it is required that the process is immediately stopped by stopping the main shaft when the aforementioned abnormal contact is produced. The detection of the abnormal contact, conventionally, depends on the alertness of an operator, resulting in disadvantages concerning operating efficiencies, a delay in the detection, and so on.

It is an object of the present invention to provide the main-shaft malfunction-state detector for the air bearing type machine tool, in which an abnormal contact of the main shaft with the housing is reliably and automatically detected.

SUMMARY OF THE INVENTION

The present invention is a main-shaft malfunction-state detector in an air bearing type machine tool, detecting an abnormal contact of a main shaft with a housing by providing in the machine tool in which the main shaft is supported in the housing with an air bearing, which is characterized by including: contact detection means for detecting and outputting an electrical and mechanical contacting state of the main shaft and the housing; and contact decision means for determining the contact of the main shaft with the housing by using an output signal sent from the contact detection means.

In the present invention described above, the contact detection means detects and outputs the electrical and mechanical contacting state of the main shaft and the housing. The contact decision means determines the contact of the main shaft with the housing based on the output signal sent from the contact detection means. Thus automatic and certain preventative measure, such as the main shaft of the machine tool stops and so on, are based on the above decision.

More specifically, the following structures can be employed.

In the machine tool in which the housing is electrically insulated from a main body of the machine tool, the contact detection means detects electric conductivity between the housing and the main body of the machine tool; and the contact decision means determines the contact when the electric conductivity exceeds a predetermined threshold value.

The aforementioned structure shows the main shaft is in an electric conductive state with the main body of the machine tool through a tool and a processed work piece, thereby allowing the contact detection means to detect the electric conductivity resulted from the contact of the main shaft with the housing. The contact detection means detects the conductivity between the main shaft and the housing, and then, the contact decision means checks current or the like caused by the conductivity, with the result that the presence of the contact is determined.

The detection or the decision is the decision for the electric conductivity caused by the contact, so that the reliable contact decision can be carried out.

The contact detection means is an AE sensor detecting acoustic emission created in the housing; and the contact decision means determines the contact when the output signal sent from the AE sensor exceeds a predetermined threshold value.

The aforementioned structure shows the contact detection means detects the acoustic emission (AE; the phenomenon of high-frequency sound created when distortion energy accumulated in a solid is released with plastic deformation or demolition of the solid) created in the housing by the contact of the main shaft with the housing, and the contact decision means carries out the contact decision.

The machine tool structure is such that the operations can be carried out simply by the AE sensor, or the likes.

The contact detection means is an acceleration vibration meter detecting vibration of the housing; and the contact decision means determines the contact when the output signal sent from the acceleration vibration meter exceeds a predetermined threshold value.

According to the aforementioned structure, vibration created in the housing by the contact of the main shaft with the housing is detected by the contact detection means and the contact decision is carried out by the contact decision means.

The machine tool structure is such that the operations can be carried out simply by the acceleration vibration meter, or the likes.

In the machine tool in which the housing is electrically insulated from the main body of the machine tool, the contact detection means detects electrostatic capacity generated between the housing and the main body of the machine tool; and the contact decision means determines the contact when the electrostatic capacity exceeds a predetermined threshold value.

According to the above structure, the main shaft is in the electrical conductive state with the main body of the machine tool through the tool and the processed work piece. The main shaft and the housing are adjacently opposed to each other to be spaced slightly by the air bearings in a state that the main shaft and the housing are electrically insulated. Thereby electrostatic capacity is generated by using the main shaft and the housing as a pair of electrodes. The generated electrostatic capacity is detected by the contact detection means and changed by the contact of the main shaft with the housing or the other reasons.

Therefore, the contact detection means detects the electrostatic capacity generated between the main shaft and the housing and the contact decision means can carry out the contact decision.

DETAILED DESCRIPTION OF THE PREFERRED EMBODIMENT(S)

The preferred embodiments according to the present invention will be explained in detail below with reference to the attached drawings.

Basic Structure of the First Embodiment

Figure 1:
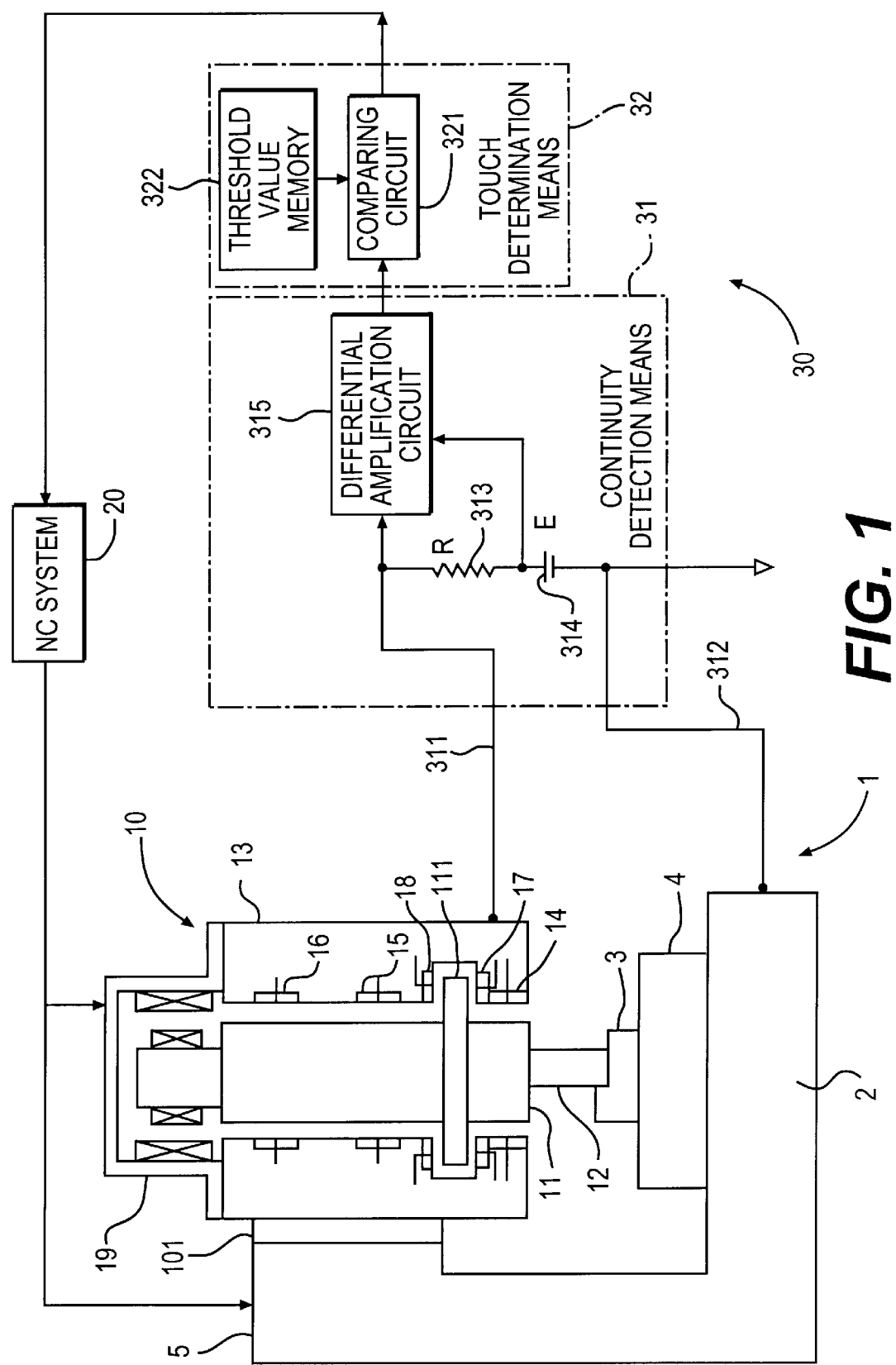
FIG. 1 is a block diagram showing the first embodiment according to the present invention.

In FIG. 1, a machine tool 1 of the embodiment has a table 4 for placing a processed work piece 3 on a base 2, and a column 5 at an end of the base 2.

A main-shaft head 10 is supported with the column 5, and provided with a tool for cutting 12 at the end of a main shaft 11 rotatably supported in the main-shaft head 10.

Incidentally, between the main-shaft 10 and the column 5, an insulation 101 is unitedly located to electrically insulate the main-shaft head 10 from the column 5, the base 2, the table 4 and so on.

The main-shaft head 10 and the table 4 are three-dimensionally and relatively moved by a moving system (not shown), thereby the tool 12 is touched to the work piece 3 to perform a cutting process.

The relative movement is carried out on the basis of an operating instruction sent from an NC system 20. The NC system 20 is an existing system, which outputs various operating instructions based on predetermined programs for the process.

The main-shaft 10 has a housing 13 and uses an air static-pressure bearing for supporting the main shaft 11.

The main shaft 11 has a flange 111 at a portion in the housing 15, and the air static-pressure bearings 14, 15 and 16, of which one of the bearings is located under the flange 111 towards the tool 12 in the radial direction and the other two bearings are located above the flange 111 in the radial direction. Further, a pair of air static-pressure bearings 17 and 18 are provided in the axial direction to sandwich the flange 111.

High-pressure air is supplied to the air static-pressure bearings 14 to 18, thereby the main shaft 11 is floatingly supported with a predetermined bearing-clearance in each of the bearings 14 to 18 so as to be supported to rotate to the housing 13 in the radial direction and the axial direction.

At this point, when the main shaft 11 is in a normal state, the main shaft 11 does not contact the housing 13, therefore, the main shaft 11 and the housing 13 are electrically insulated from each other.

Incidentally, where the work piece 13 is made of metal, the main shaft 11 is in an electric conductive state with the table 4, the base 2 and the column 5 through the tool 12 and the work piece 3.

From the tool 12 on the opposite side of the housing 13, a built-in motor 19 is attached to rotatably drive the main shaft 11.

The built-in motor 19 is an induction motor, and controlled to rotate the main shaft 11 and the tool 12 by a motor driver (not shown) based on the operating instruction sent from the NC system 20.

Main-Shaft Malfunction-State Detector of the First Embodiment

In the machine tool structured as described above, an electric conductivity detecting type main-shaft malfunction-state detector 30 is provided.

The main-shaft malfunction-state detector 30 includes a conductivity detection means 31 for detecting electric conductivity between the housing 13 and a main body of the machine tool 1, and a contact decision means 32 for carrying out contact decision based on an output of the conductivity detection means 31.

Incidentally, the main body of the machine tool 1 means portions excluding the main-shaft head 10, the base 2, the table 4, the column 5 and so on.

The conductivity detection means 31 has a cable 311 connected to the housing 13 at an end of the cable 311, and a cable 312 connected to the base 2 at an end of the cable 312, in which a resistance 313 and a direct-current power supply 314 are connected in series between the other ends of the cables 311 and 312. Both ends of the resistance 313 are respectively connected to a pair of input terminals of a differential amplification circuit 315.

At this point, where the main shaft 11 is in the normal state not to contact the housing 13, there is no electric conductivity between the main shaft 11 and the housing 13.

However, when the main shaft 11 comes in contact with the housing 13 by deforming under the over load, the main shaft 11 and the housing 13 are brought into the conductive state.

More specifically, a closed-circuit, from the housing 13, through the main shaft 11, the tool 12, the work piece 3, the table 4, the base 2, the cable 312, the direct-current power supply 314, the resistance 313 and the cable 311 to the housing 13, is formed, in which predetermined voltage is generated at both ends of the resistance 313.

The voltage is generated at both ends of the resistance 313, whereupon the differential amplification circuit 315 generates a signal output in response to the voltage. The signal output is sent to the contact decision means 32.

The contact decision means 32 includes a comparing circuit 321 composed of a comparator and so on and a threshold value memory 322 storing threshold values as a standard of comparison.

The comparing circuit 321 compares the signal output sent from the conductivity detection means 31 and the threshold value sent from the threshold value memory 322. As a consequence, the comparing circuit 321 determines that there is conductivity when the signal output exceeds the threshold value, and then, sends a malfunction signal, showing that the contact is produced, to the NC system 20.

The NC system 20, after receiving the malfunction signal, instructs the machine tool 1 on a malfunction stop to immediately stop the main shaft as a preventative measures avoiding a seizure caused by the abnormal contact, and so on.

Incidentally, the decision is for determining whether the contact causes conductivity or not, so that 0 or a small value for avoiding noise is used for the threshold value.

An alternating-current power supply can be used instead of the direct-current power supply 314.

Effects of the First Embodiment

According to the embodiment described thus far, the contacting state of the main shaft 11 and the housing 13 is detected as presence of electric conductivity by the contact detection means 31, and then the contact decision means 32 determines the contact of the main shaft 11 with the housing 13 based on the conductivity. Thus automatic and certain preventative measures, such as the main shaft of the machine tool stops and so on, are based on the above decision.

At this time, by using the built-in motor 19 and unitedly providing the insulation 101 between the housing 13 and the column 5, electrical insulation, created by reasons exclusive of the contact of the main shaft 11 with the housing 13, can be ensured, so that electric conductivity is not created when the main shaft 11 and the housing 13 are in a not-contacting state normally.

The main shaft 11 is in the electric conductive state with the main body of the machine tool 1 through the tool 12 and the work piece 3, so that the electric conductivity created when the main shaft 11 comes in contact with the housing 13 can be detected by the contact detection means 31.

The detection or, the decision is the decision for the electric conductivity caused by the contact, so that the reliable contact decision can be carried out.

Basic Structure of the Second Embodiment

Figure 2:
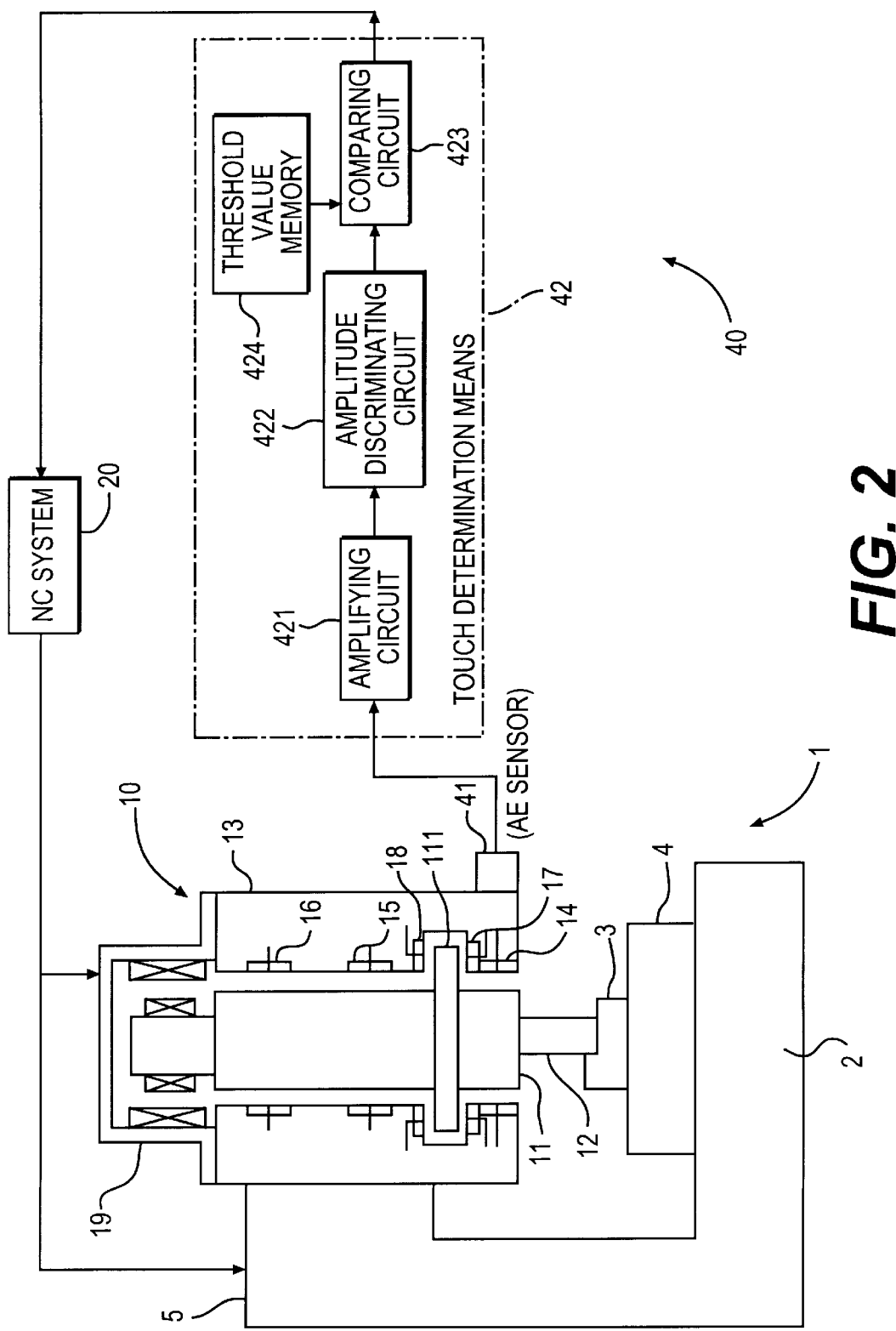
FIG. 2 is a block diagram showing the second embodiment according to the present invention.

In FIG. 2, the machine tool 1, the base 2, the processed work piece 3, the table 4, the column 5, the main-shaft head 10, the main shaft 11, the tool 12, the housing 13, the air static-pressure bearings 14 to 18, the built-in motor 19, and the NC system 20 which are used in the embodiment are the same as the aforementioned first embodiment, so that the description will be omitted with the use of the same reference numerals.

Incidentally, electrical insulation or the like is not especially needed between the main-shaft head 10 and the column 5.

Main-Shaft Malfunction-State Detector of the Second Embodiment

An acoustic emission detecting type main-shaft malfunction-state detector 40 is placed in the machine tool 1 described above.

The main-shaft malfunction-state detector 40 includes an AE sensor 41 detecting acoustic emission created in the housing 13, and a contact decision means 42 for carrying out the contact decision based on the output of the AE sensor 41.

The AE sensor 41 is provided at an end portion of the housing 13 towards the attached side of the tool 12, and detects and outputs AE created in the housing 13.

The contact decision means 42 includes an amplifying circuit 421 amplifying an AE signal sent from the AE sensor 41; an amplitude discriminating circuit 422 measuring amplitude of the amplified AE signal; a comparing circuit 423 composed of a comparator and so on, and a threshold value memory 424 storing threshold values as a standard of comparison.

The comparing circuit 423 compares the signal, showing a size of amplitude of AE, sent from the amplitude discriminating circuit 422 and the threshold value sent from the threshold value memory 424. As a consequence, the comparing circuit 423 determines that there is conductivity when the size of amplitude exceeds the threshold value, and then, sends a malfunction signal, showing that the contact is produced, to the NC system 20.

The NC system 20, after receiving the malfunction signal, instructs the machine tool 1 on a malfunction stop to immediately stop the main shaft as a preventative measures avoiding a seizure caused by the abnormal contact, and so on.

Incidentally, as the threshold value, an AE amplitude value, measured in the normal state that the main shaft 11 does not contact the housing 13, or the like may be used.

Effects of the Second Embodiment

According to the embodiment as described thus far, the contacting state of the main shaft 11 and the housing 13 is detected as acoustic emission by the AE sensor 41, and then the contact of the main shaft 11 with the housing 13 is determined by the contact decision means 42 based on the AE signal. Thus automatic and certain preventative measures, such as the main shaft of the machine tool stops and so on, are based on the above decision.

The machine tool 1 structure is such that the operations can be carried out simply by the AE sensor 41, or the likes.

Basic Structure of the Third Embodiment

Figure 3:
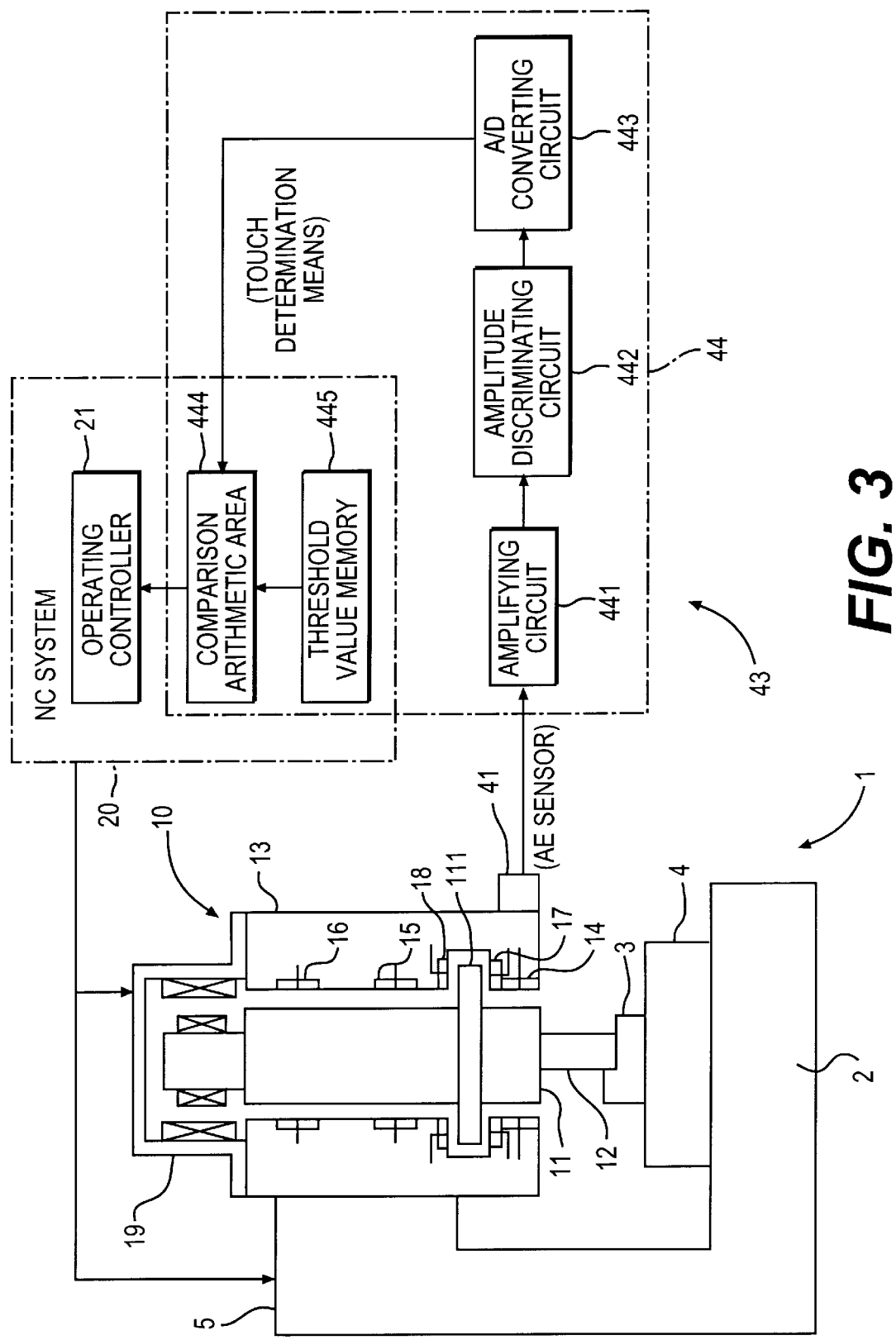
FIG. 3 is a block diagram showing the third embodiment according to the present invention.

In FIG. 3, the machine tool 1, the base 2, the processed work piece 3, the table 4, the column 5, the main-shaft head 10, the main shaft 11, the tool 12, the housing 13, the air static-pressure bearings 14 to 18, the built-in motor 19, and the NC system 20 which are used in the embodiment are the same as the aforementioned first embodiment, so that the description will be omitted with the use of the same reference numerals.

Incidentally, electrical insulation or the like is not especially needed between the main-shaft head 10 and the column 5.

Main-Shaft Malfunction-State Detector of the Third Embodiment

An acoustic emission detecting type main-shaft malfunction-state detector 43 is provided in the machine tool 1 described above.

The main-shaft malfunction-state detector 43 has the AE sensor 41 detecting acoustic emission created in the housing 13 and a contact decision means 44 for carrying out the contact decision based on the output of the AE sensor 41.

The AE sensor 41 is provided at an end portion of the housing 13 towards the attached side of the tool 12, and detects and outputs AE created in the housing 13 (the same as in the second embodiment).

The contact decision means 44 has an amplifying circuit 441 amplifying AE signal sent from the AE sensor 41; an amplitude discriminating circuit 442 measuring amplitude of the amplified AE signal; and an A/D converting circuit 443 converting the amplitude signal into a digital form.

Further, as a part of the contact decision means 44, a comparison arithmetic area 444 practiced by software and a threshold value memory 445 storing threshold values as a standard of the comparison are provided in the NC system 20.

In the contact decision means 44, the AE signal sent from the AE sensor 41 is sent as a digital signal showing a size of amplitude of AE through the amplifying circuit 441, the amplitude discriminating circuit 442 and the A/D converting circuit 443 to the NC system 20.

In the NC system 20, the comparison arithmetic area 444 compares the signal showing the size of amplitude of AE and the threshold value sent from the threshold value memory 445. As a consequence, the comparison arithmetic area 444 determines that there is conductivity when the size of amplitude exceeds the threshold value, and then, sends a malfunction signal, showing that the contact is produced, to an operating controller 21.

The operating controller 21, after receiving the malfunction signal, instructs the machine tool 1 on a malfunction stop to immediately stop the main shaft as a preventative measures avoiding a seizure caused by the abnormal contact, and so on.

Incidentally, as the threshold value, an AE amplitude value, measured in the normal state that the main shaft 11 does not contact the housing 13, or the like may be used.

Effects of the Third Embodiment

According to the embodiment as described thus far, the contacting state of the main shaft 11 and the housing 13 is detected as acoustic emission by the AE sensor 41, and then the contact of the main shaft 11 with the housing 13 is determined by the contact decision means 42 based on the AE signal. Thus automatic and certain preventative measures, such as the main shaft of the machine tool stops and so on, are based on the above decision.

The machine tool 1 structure is such that the operations can be carried out simply by the AE sensor 41, or the likes.

Further, the comparison arithmetic area 444 and the threshold value memory 445 are formed in the NC system 20, and are thereby easily achieved by software, and allow setting changes, such as the threshold value appropriate for each of various tools 12 and so on, to be easily carried out.

However, it may take time to process the arithmetic in the NC system 20, in some cases, therefore, specific hardware as that in the aforementioned second embodiment, or the like may be more adaptable.

Basic Structure of the Fourth Embodiment

Figure 4:
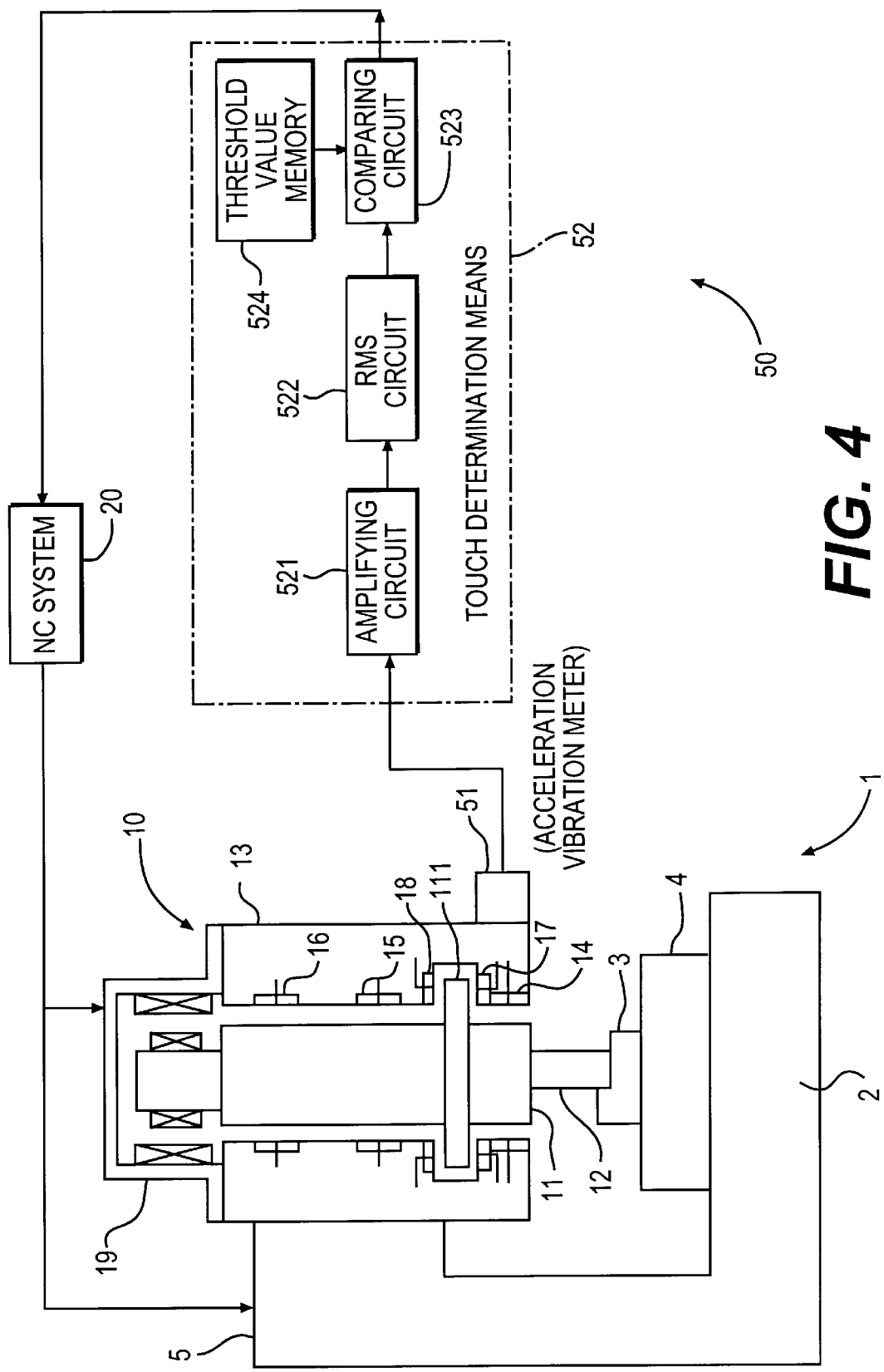
FIG. 4 is a block diagram showing the fourth embodiment according to the present invention.

In FIG. 4, the machine tool 1, the base 2, the processed work piece 3, the table 4, the column 5, the main-shaft head 10, the main shaft 11, the tool 12, the housing 13, the air static-pressure bearings 14 to 18, the built-in motor 19, and the NC system 20 which are used in the embodiment are the same as the aforementioned first embodiment, so that the description will be omitted with the use of the same reference numerals.

Incidentally, electrical insulation or the like is not especially needed between the main-shaft head 10 and the column 5.

Main-Shaft Malfunction-State Detector of the Fourth Embodiment

A vibration detecting type main-shaft malfunction-state detector 50 is placed in the machine tool 1 described above.

The main-shaft malfunction-state detector 50 has an acceleration vibration meter 51 detecting vibration created in the housing 13 and a contact decision means 52 for carrying out the contact decision based on the output of the acceleration vibration meter 51.

The acceleration vibration meter 51 is provided at an end portion of the housing 13 towards the attached side of the tool 12, and detects and outputs vibration created in the housing 13.

The contact decision means 52 has an amplifying circuit 521 amplifying a signal sent from the acceleration vibration meter 51; a RMS circuit 522 converting a change in amplitude of the amplified signal into a change in level; a comparing circuit 523 composed of a comparator and so on; and a threshold value memory 524 storing threshold values as a standard of comparison.

The comparing circuit 523 compares the signal showing a size of amplitude of vibration sent from the RMS circuit 522 and the threshold value sent from the threshold value memory 524; determines that there is conductivity when the size of amplitude exceeds the threshold value; and sends a malfunction signal, showing the contact is produced, to the NC system 20.

The NC system 20, after receiving the malfunction signal, instructs the machine tool 1 on a malfunction stop to immediately stop the main shaft as a preventative measures avoiding a seizure caused by the abnormal contact, and so on.

Incidentally, as the threshold value, a value, outputted from the RMS circuit 522 in the normal state that the main shaft 11 is not in contact with the housing 13, can be used.

Effects of the Fourth Embodiment

According to the embodiment as described thus far, vibration created by the contact of the main shaft 11 with the housing 13 is detected by the acceleration vibration meter 51, and then the contact of the main shaft 11 with the housing 13 is determined by the contact decision means 52 based on the detected signal. Thus automatic and certain preventative measures, such as the main shaft of the machine tool stops and so on, are based on the above decision.

The machine tool 1 structure is such that the operations can be carried out simply by the acceleration vibration meter 51, or the likes.

Basic Structure of the Fifth Embodiment

Figure 5:
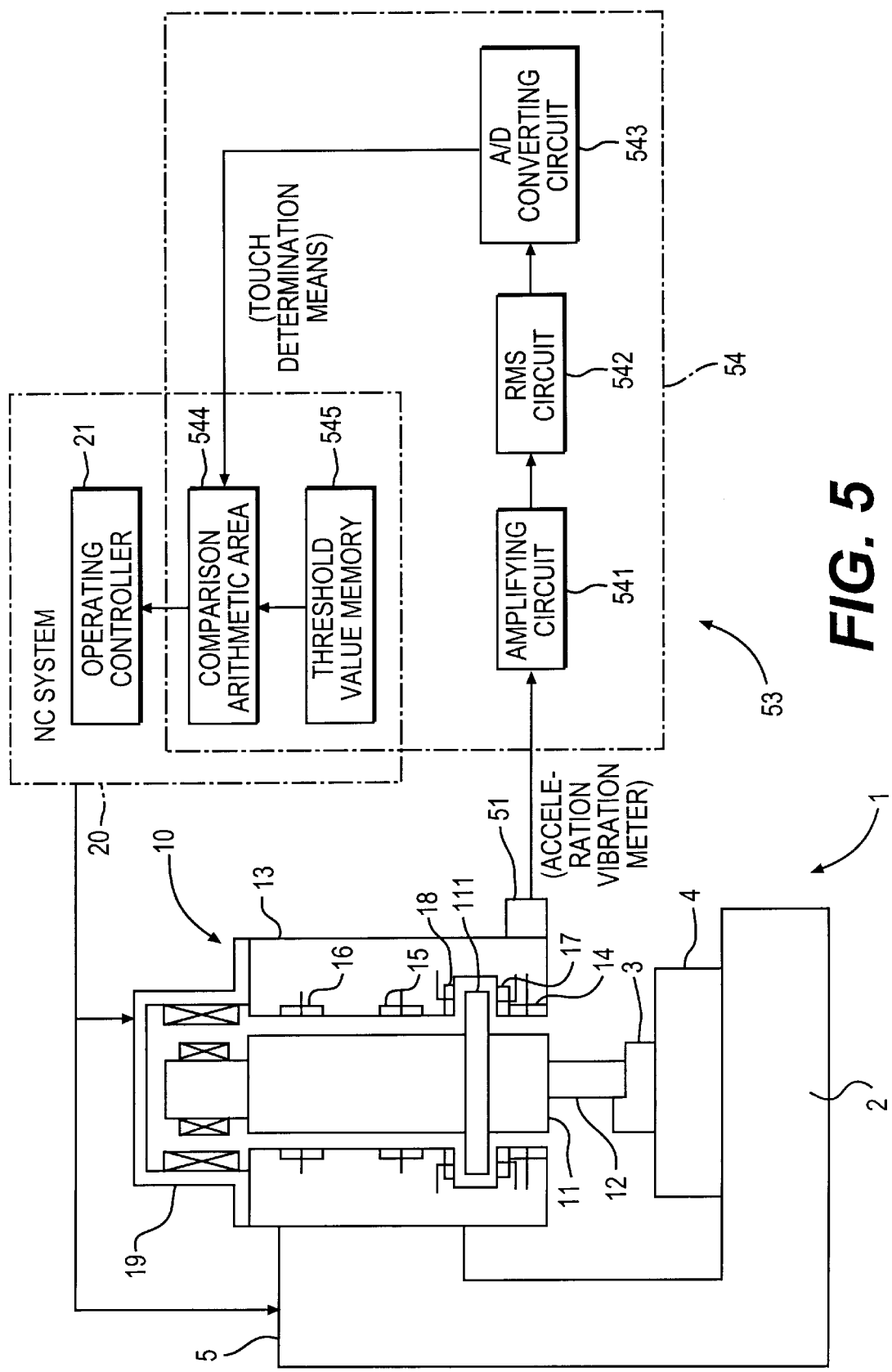
FIG. 5 is a block diagram showing the fifth embodiment according to the present invention.

In FIG. 5, the machine tool 1, the base 2, the processed work piece 3, the table 4, the column 5, the main-shaft head 10, the main shaft 11, the tool 12, the housing 13, the air static-pressure bearings 14 to 18, the built-in motor 19, and the NC system 20 which are used in the embodiment are the same as the aforementioned first embodiment, so that the description will be omitted with the use of the same reference numerals.

Incidentally, electrical insulation or the like is not especially needed between the main-shaft head 10 and the column 5.

Main-Shaft Malfunction-State Detector of the Fifth Embodiment

A vibration detecting type main-shaft malfunction-state detector 53 is placed in the machine tool 1 described above.

The main-shaft malfunction-state detector 53 has the acceleration vibration meter 51 detecting vibration created in the housing 13 and a contact decision means 54 for carrying out the contact decision based on the output of the acceleration vibration meter 51.

The acceleration vibration meter 51 is provided at an end portion of the housing 13 towards the attached side of the tool 12, and detects and outputs vibration created in the housing 13 (the same as in the fourth embodiment).

The contact decision means 54 has an amplifying circuit 541 amplifying the signal sent from the acceleration vibration meter 51; a RMS circuit 542 converting a change in amplitude of the amplified signal into a change in level; and an A/D converting circuit 543 converting the level signal into a digital form.

Further, as a part of the contact decision means 54, a comparison arithmetic area 544 practiced by software and a threshold value memory 545 storing threshold values as a standard of the comparison are provided in the NC system 20.

In the contact decision means 54, the signal sent from the acceleration vibration meter 51 is sent as a digital signal showing a size of amplitude of vibration through the amplifying circuit 541, the RMS circuit 542 and the A/D converting circuit 543 to the NC system 20.

In the NC system 20, the comparison arithmetic area 544 compares the signal showing the size of amplitude and the threshold value sent from the threshold value memory 545. As a consequence, the comparison arithmetic area 544 determines that there is conductivity when the size of amplitude exceeds the threshold value, and then, sends a malfunction signal, showing that the contact is produced, to the operating controller 21.

The operating controller 21, after receiving the malfunction signal, instructs the machine tool 1 on a malfunction stop to immediately stop the main shaft as a preventative measures avoiding a seizure caused by the abnormal contact, and so on.

Incidentally, as the threshold value, an amplitude value of vibration, measured in the normal state that the main shaft 11 is not in contact with the housing 13, or the like may be used.

Effects of the Fifth Embodiment

According to the embodiment as described thus far, vibration created by the contact of the main shaft 11 with the housing 13 is detected by the acceleration vibration meter 51, and then the contact of the main shaft 11 with the housing 13 is determined by the contact decision means 54 based on the detected signal. Thus automatic and certain preventative measures, such as the main shaft of the machine tool stops and so on, are based on the above decision.

The machine tool 1 structure is such that the operations can be carried out simply by the acceleration vibration meter 51 or the likes.

Further, the comparison arithmetic area 544 and the threshold value memory 545 are formed in the NC system 20, and are thereby easily achieved by software, and allow setting changes, such as the threshold value appropriate for each of the various tools 12 and so on, to be easily carried out.

However, it may take time to process the arithmetic in the NC system 20, in some cases, therefore, specific hardware as that in the aforementioned fourth embodiment, or the like may be further adaptable.

Basic Structure of the Sixth Embodiment

Figure 6:
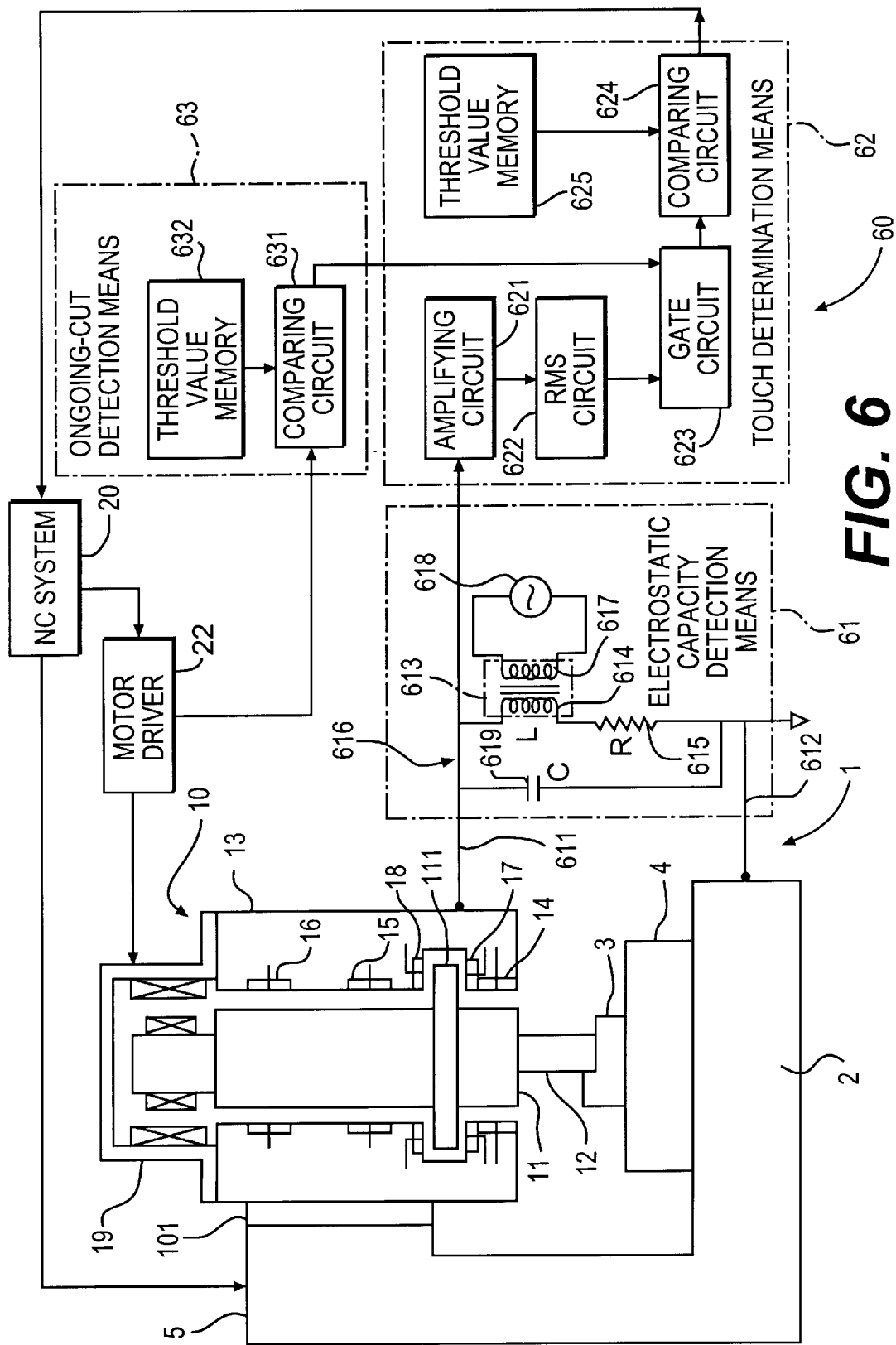
FIG. 6 is a block diagram showing the sixth embodiment according to the present invention.

In FIG. 6, the machine tool 1, the base 2, the processed work piece 3, the table 4, the column 5, the main-shaft head 10, the main shaft 11, the tool 12, the housing 13, the air static-pressure bearings 14 to 18, the built-in motor 19, and the NC system 20 which are used in the embodiment are the same as the aforementioned first embodiment, so that the description will be omitted with the use of the same reference numerals.

Incidentally, the insulation 101 is unitedly located between the main-shaft head 10 and the column 5 to electrically insulate the main-shaft head 10 from the column 5, the base 2, the table 4 and so on.

Main-Shaft Malfunction-State Detector of the Sixth Embodiment

An electrostatic capacity type main-shaft malfunction-state detector 60 is placed in the machine tool 1 described above.

The main-shaft malfunction-state detector 60 has an electrostatic capacity detection means 61 for detecting changes of electrostatic capacity generated between the housing 13 and the main body of the machine tool 1; a contact decision means 62 for carrying out the contact decision based on the output; and an ongoing-cut detection means 63 for detecting that the cutting operation is started.

Incidentally, the main body of the machine tool 1 means portions excepting the main-shaft head 10, the base 2, the table 4, the column 5 and so on.

The housing 13 is electrically insulated from the main body of the machine tool 1 and the main shaft 11; the main shaft 11 and the housing 13 are kept adjacently opposing to each other by the air bearings 14 to 18, and, in the normal cutting process, a predetermined electrostatic capacity Cx is generated between the main shaft 11 and the housing 13.

The electrostatic capacity detection means 61 has a cable 611 connected at an end of the cable 61 to housing 13 and a cable 612 connected an end of the cable 612 to the base 2, in which a secondary coil 614 of a transformer 613 and a resistance 615 are connected to each other in series between the other ends of the cables 611 and 612.

Thereby, by sandwiching Cx between the main shaft 11 and the housing 13, a resonant circuit 616, from the main shaft 11, through the tool 12, the work piece 3, the table 4, the base 2, the cable 612, R of the resistance 615, L of the secondary coil 614, and the cable 611 to the housing 13, is designed.

Figure 7:
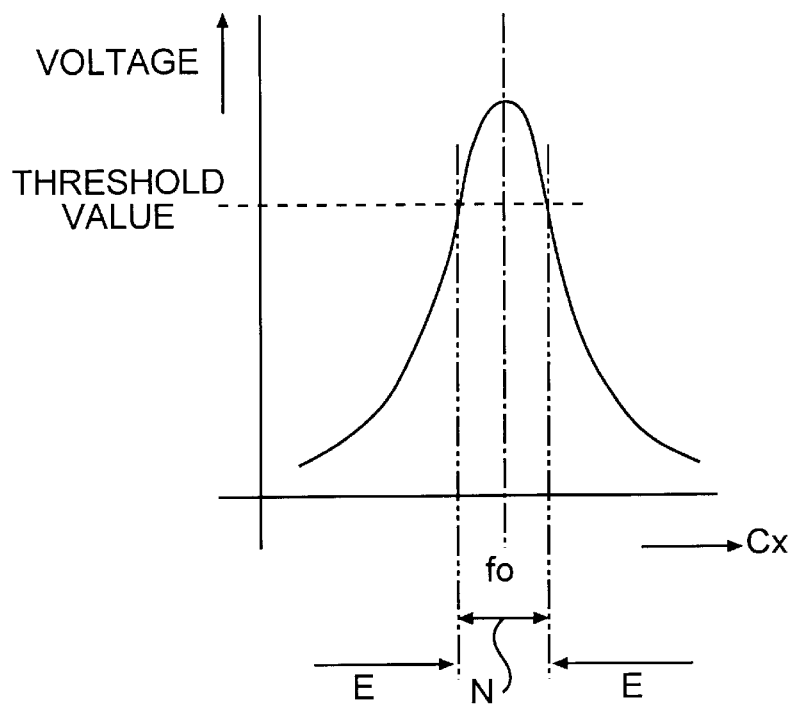
FIG. 7 is a graph showing a resonant state in the sixth embodiment.

A high-frequency oscillator 618 is connected to a primary coil 617 of the transformer 613, so that the resonant circuit 616 is excited with resonant frequency fo (see FIG. 7) responding to Cx, R and L of the resonant circuit 616.

The resonant circuit 616 is connected to a capacitor 619 for protecting the consonant circuit 616 in parallel to the secondary coil 614 and the resistance 615.

The voltage output of the resonant circuit 616 is connected to the contact decision means 62.

The contact decision means 62 includes an amplifying circuit 621 amplifying the voltage output sent from the resonant circuit 616; a RMS circuit 622 converting a change in amplitude of the amplified signal to a change in level; a gate circuit 623 interrupting the signal from the RMS circuit 622 in response to a gate signal sent from the ongoing-cut detection means 63; a comparing circuit 624 composed of a comparator and so on; and a threshold value memory 625 storing threshold values as a standard of comparison.

The comparing circuit 624 compares the signal, sent from the RMS circuit 622 when the gate circuit 623 is in the conductive state, and the threshold value sent from the threshold value memory 625. As a result, the comparing circuit 624 determines the normal state while the signal sent from the RMS circuit 622 exceeds the threshold value (area N in FIG. 7), but determines the malfunction state when the signal is below the threshold value (area E in FIG. 7) and sends a malfunction signal, showing that the contact is produced, to the NC system 20.

More specifically, where electrostatic capacity between the main shaft 11 and the housing 13 is the required value Cx, the required consonance is created in the consonant circuit 616, therefore, the signal sent from the RMS circuit 622 shows a high level. On the other hand, when the main shaft 11 comes in contact with the housing 13 by deformation or the like, electrostatic capacity fluctuates from Cx. Thereby the required consonance is not produced in the consonant circuit 616, so that the signal sent from the RMS circuit 622 is reduced. Therefore, it is possible to discriminate between the area N and the area E with the predetermined threshold value.

Incidentally, as the threshold value, an actual value of the signal, sent from the RMS circuit 622 in the state producing deformation just before the main shaft 11 contacts, or the like can be used.

The NC system 20, after receiving the malfunction signal, instructs the machine tool 1 on a malfunction stop to immediately stop the main shaft as a preventative measures avoiding a seizure caused by the abnormal contact, and so on.

The gate circuit 623 and the ongoing-cut detection means 63 are provided in order to avoid determining the malfunction state when the electrostatic capacity Cx obtains a different value in the not-cutting process; although it obtains the predetermined value in the cutting process.

The ongoing-cut detection means 63 has a comparing circuit 631 composed of a comparator and so on, and a threshold value memory 632 storing threshold values as a standard of comparison.

Figure 8:
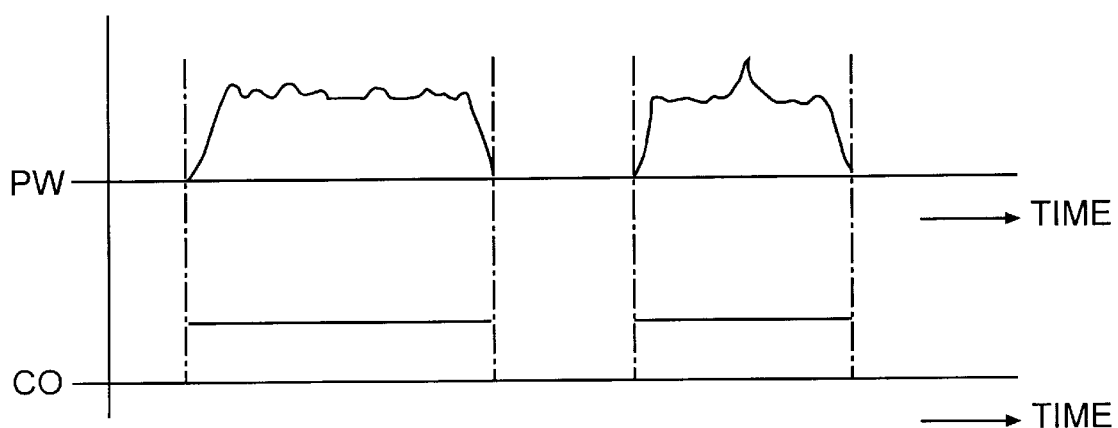
FIG. 8 is a graph showing a ongoing-cut detection in the sixth embodiment.

The comparing circuit 631 is connected to a motor driver 22 controlling the built-in motor 19 based on the operating instruction of the NC system 20 to detect a consumption power PW of the built-in motor 19 (see the top of FIG. 8). And, the comparing circuit 631 compares the above consumption power and the threshold value sent from the threshold value memory 632. As a result, it determines the cutting process while the consumption power is larger than the threshold value, and sends an ongoing-cutting signal CO (see the bottom of FIG. 8) to the gate circuit 623, thereby the signal sent from the RMS circuit 622 is sent to the comparing circuit 624.

Incidentally, as the threshold value, an actual value of the consumption power in the not-cutting process or the like can be used.

Effects of the Sixth Embodiment

According to the embodiment described thus far, the contacting state of the main shaft 11 and the housing 13 is detected as a change of electrostatic capacity by the contact detection means 61. The contact decision means 62 determines the contact of the main shaft 11 with the housing 13 based on the above detection. Thus automatic and certain preventative measures, such as the main shaft of the machine tool stops and so on, are based on the above decision.

At this time, the built-in motor 19 is used, the insulation 101 is unitedly placed between the housing 13 and the column 5, and further, the main shaft 11 is in the electric conductive state with the main body of the machine tool 1 through the tool 12 and the work piece 3, so that the consonant circuit 616 including the electrostatic capacity Cx between the main shaft 11 and the housing 13 can be designed, thereby determining the normal state that the main shaft 11 and the housing are not connected to each other.

Further, when the electrostatic capacity Cx obtaining the predetermined value in the cutting process is to be a different value in the not-cutting process, the gate circuit 623 and the ongoing-cut detection means 63 protect it from determining as the malfunction state.

Incidentally, it is to be understood that the present invention is not intended to be limited to the aforementioned embodiments, and various changes, such as modifications described below, may be made therein without departing from the spirit of the present invention. Such changes are included in the scope of the present invention.

The circuit designs of the conductivity detection means 31 and the electrostatic capacity detection means 61 in each of the aforementioned embodiments can be appropriately changed in the scope obtaining the similar function, and further, models, rating and so on of the AE sensor 41 and the acceleration vibration meter 51 may be appropriately changed. The contact detection means is not limited to each of the aforementioned embodiments, and can be appropriately changed insofar that the contact of the main shaft 11 with the housing 13 is detected.

The circuit designs of the contact decisions 32, 42 44, 52, 54 and 62 in each of the aforementioned embodiments can be appropriately changed in the scope obtaining the similar function, and may be properly defined in response to the signal outputted from the contact detection means.

Furthermore, a form of the machine tool 1 applied in the present invention or the like can be appropriately changed, that is to say the number, forms and positions of the air bearings 14 to 18 supporting the main shaft 11 may be properly changed.

What is claimed is:

1. A main-shaft malfunctioning detector in an air bearing type machine tool, for detecting an abnormal contact of a main shaft of the machine tool with a housing supporting the main shaft through an air bearing, the housing being electrically insulated from a main body of the machine tool, the malfunctioning detector contact detection means for detecting electrical and mechanical contact of the main shaft and the housing and outputting an output signal, the contact detection means being capable of detecting electrostatic capacitance between the housing and the main body of the machine tool, the contact detection means being an electrostatic capacitance detection circuit including a resonant circuit having electrostatic capacitance in a clearance between the main shaft and the housing as an element and an oscillator for generating an oscillating current for the resonant circuit; and contact decision means for determining the detected contact of the main shaft and the housing by using the output signal sent from said contact detection means, the contact decision means being capable of determining the contact when the electrostatic capacity exceeds a predetermined threshold value, the contact decision means having an amplifying circuit for amplifying a voltage output sent from the resonant circuit, a RMS circuit for converting a change in amplitude of the output value of the amplifying circuit to a change in level, a threshold value memory for storing the predetermined threshold values, and a comparing circuit for comparing the threshold value stored in the threshold value memory and the output value of the RMS circuit.

2. The main-shaft malfunctioning detector in the air bearing type machine tool according to claim 1, wherein said contact decision means is connected to ongoing-cut detection means for monitoring power consumption of the machine tool and outputting a gate signal when the machine tool is in a cutting operation, and the contact decision means further comprises a gate circuit placed between said RMS circuit and said comparing circuit to send a signal from said RMS circuit to said comparing circuit while receiving the gate signal.

* * * * *

UNITED STATES PATENT AND TRADEMARK OFFICE
CERTIFICATE OF CORRECTION

PATENT NO. : 6,101,866

DATED : 8/15/2000

INVENTOR(S) : Masahito Shiozaki et al.

It is certified that error appears in the above-identified patent and that said Letters Patent is hereby corrected as shown below:

Column 12, line 30, after "detector" insert --comprising--

Signed and Sealed this

Twenty-second Day of May, 2001

*Attest:*

NICHOLAS P. GODICI

*Attesting Officer*   Acting Director of the United States Patent and Trademark Office